INVENTORS
DAVID COOPER
RICHARD C. LENZ
BY
THEIR ATTORNEY

Sept. 24, 1968   D. COOPER ET AL   3,402,972
CONTINUOUS PRESSURE CONTROL SYSTEM
Filed Aug. 11, 1966   5 Sheets-Sheet 3

INVENTORS
DAVID COOPER
RICHARD C. LENZ
BY
THEIR ATTORNEY

3,402,972
CONTINUOUS PRESSURE CONTROL SYSTEM
David Cooper and Richard C. Lenz, Erie, Pa., assignors to General Electric Company, a corporation of New York
Filed Aug. 11, 1966, Ser. No. 571,937
12 Claims. (Cl. 303—20)

ABSTRACT OF THE DISCLOSURE

A fluid brake control system wherein electrical signals representative of actual and desired fluid pressure are compared to provide an error signal which upon exceeding a predetermined threshold actuates for a controlled time period a power amplifier which in turn regulates a pressure adjusting valve.

---

This invention relates to continuous pressure control systems, and more specifically, it relates to a system especially suitable for a continuous air brake pressure control system having particular application to automatic control systems for railway vehicles such as the type used for rapid transit applications.

Recent emphasis on high speed, high performance urban rapid transit and railway systems has begun to tax the capabilities of traditional human operators of rapid transit and railway systems. The increasing complexities involved in operating these systems at full capacity, while still providing stringent safety requirements necessary for human passengers, have emphasized the growing need for fully automatic operation of these systems.

In answer to this need, recent developments have employed vehicle carried apparatus for automatically operating rapid transit or other railway vehicles in accordance with a number of received command signals. The command signals are transmitted from wayside and may be selected in accordance with local track and traffic conditions, or in accordance with traffic conditions only, depending on the type of vehicle separation system employed. A system of this type is disclosed and claimed in patent application Ser. No. 418,132 now U.S. Patent No. 3,334,224, filed Dec. 14, 1964 and assigned to the assignee of the present invention.

In the above-identified system, means are provided for establishing specific speed reference signals from command signals received from wayside. Means are also provided for developing a signal representative of the actual speed of the vehicle and, by comparison of the actual speed signal with the reference speed signal, deriving a speed error signal. Means are further provided for generating open loop speed signals, in response to the received command signals, for scheduling vehicle propulsion or braking effort to maintain the reference speed under nominal conditions. Finally, means are provided for causing the propulsion or braking effort applied to the vehicle to be modulated about the open loop signal level to maintain the reference speed under operated conditions.

The system also includes means actuated by a received wayside signal for causing a preselected speed-distance program signal to be generated. These means also generate a signal representing the actual distance of the vehicle to a desired stopping point. The comparison of the last two signals produces a distance-error signal. Means are further provided for generating an open-loop braking rate signal adapted to schedule vehicle braking effort to stop the vehicle at the desired point under nominal conditions. Means are also provided to cause the vehicle propulsion or braking effort to be modulated about the open-loop level to effect stopping of the vehicle at the desired point under actual operating conditions.

The above-described system is merely an example of one type of system in which the present invention is useful. Railway systems of the type described employ air brake systems requiring regulated air pressure. The air pressure is controlled by a continuous air brake control system which acts as a link or interface between a computation section (regulator) of the automatic control system and the air brakes themselves.

An early air brake control system used a number of relays to actuate air brake valves to regulate the pressure to the air brakes themselves. It was soon realized that the relays added an excessive time delay to the system, resulting either in inaccurate regulation of pressure or in an unstable system due to numerous pressure changes and excessive cycling of the air brake valves. Thus a suitable electro-pneumatic transducer was desired to provide for control of the air brake system in response to braking effort control signals coupled from the regulator.

It is an object of this invention, therefore, to provide a fluid pressure control system which can change the pressure in a fluid system with a minimum time delay after receiving an electrical control signal.

It is another object of this invention to provide a novel, continuously operable air brake control system to act as an interface between a source of electrical braking effort signals and an air brake system.

It is another object of this invention to provide an air brake control system which minimizes the number of actuations of air brake valves to maximize their life expectancy.

It is still another object of this invention to provide an air brake control system for rapid transit or other railway systems which senses a malfunction in the system.

It is a further object of this invention to provide semiconductor circuitry for use in a continuous pressure or air brake control system.

Briefly stated, in accordance with one aspect of this invention, a system for controlling the pressure in a fluid system includes a comparison circuit means for deriving an electrical error signal in response to a first electrical signal representative of the actual pressure at a given location in the fluid system and a second electrical signal representative of a desired pressure at that location. Gate means are also provided which are enabled in response to an error signal exceeding a preselected magnitude and the output of the gate means is utilized to initiate the operation of a timing circuit means, whose time cycle is determined by the magnitude of the error signal, as well as to initiate the operation of a pressure adjusting means. The timing circuit means is arranged to disable the gate means at the end of the time cycle so that the pressure adjusting means is operated for a time not exceeding that of the time cycle.

Where the dynamics of the fluid system are suitable, satisfactory operation may be provided without excessive cycling of the pressure adjusting means in accordance with another embodiment of the invention without the use of a timing circuit means. In this arrangement the pressure adjusting means is controlled from the gate means through a power amplifier means whose response time is at least two orders of magnitude faster than that of the fluid system. Where this is neither practical nor desirable, however, the embodiment employing the timing circuit means should be employed.

The specification concludes with claims particularly pointing out and distinctly claiming the subject matter of this invention. The organization and manner and process of making and using this invention, together with further objects and advantages thereof, may be best understood by reference to the following description taken in conjunction with the accompanying drawings, in which:

This invention is generally useful for adjusting fluid pressure with a minimum time delay after an electrical control signal is received. It is particularly useful as a continuously operable air brake control system which acts as an interface between a source of electrical braking effort signals and an air brake system for rapid transit or other railway vehicles.

Figure 1:
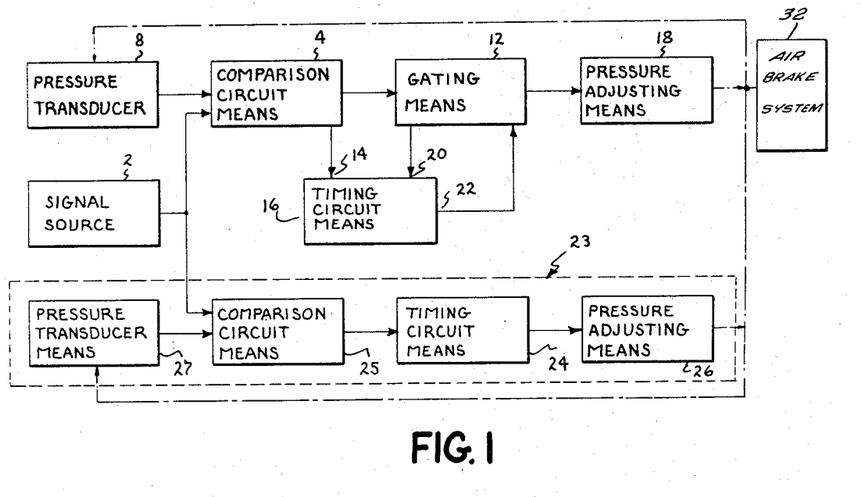
FIG. 1 is a schematic diagram of a fluid pressure control system embodying this invention, including a fail-safe emergency circuit which monitors system mulfunctions.

Referring to FIG. 1, there is shown at 2 a source of electrical signals representing a desired pressure level in the fluid system. Signal source 2 may comprise, for example, a portion of an automatic control system for vehicles such as that described in the foregoing referenced patent application. The electrical signal from source 2 is coupled to a signal comparison means 4. Transducer means 8 are provided for continuously sensing the actual fluid pressure at a test point in the fluid system and producing an electrical signal representative of that pressure. Pressure transducer 8 may be, for example, of the variable reluctance type such as that manufactured by Bourns Instrument Company. As stated, transducer 8 continuously generates electrical output signals which are a function of the pressure at the test point. The signals from the transducer 8 and signal source 2 are coupled to the comparison circuit means 4 and an error signal is derived if the actual pressure signal differs from the desired pressure signal.

Error signals from the comparison circuit means 4 are coupled to a gating means 12 which is enabled when the error signal applied thereto exceeds a preselected magnitude. The error signal is also applied to a first input terminal 14 of a timing circuit means 16. The output from the gating means 12 controls the operation of a pressure adjusting means 18 which is associated with the fluid system itself and will be described in more detail in connection with FIG. 2.

In operation, when the error signal exceeds a preselected magnitude indicating that the actual fluid pressure is greater by a preselected amount than that called for by the electrical signal from source 2, the gating means 12 is enabled to cause the pressure adjusting means 18 to control the operation of release valves which vent air from the fluid system thereby reducing the pressure. Similarly, if the error signal indicates that the pressure is less by a preselected amount than that called for by the electrical signal from source 2, the gating means 12 is enabled to cause the pressure adjusting means 18 to control the operation of valve means arranged to increase the air pressure level.

The timing circuit means 16 is arranged to disable the gating means 12 to de-activate the pressure adjusting means 18 at some time after an error signal exceeding the preselected magnitude has been received by the gating means 12. For example, when an error signal exceeding the preselected magnitude is present, gating means 12 is enabled and an output pulse therefrom is coupled to a second input terminal 20 of the timing circuit means 16. This pulse turns on the timing circuit means 16 for a timing interval which varies as a function of the magnitude of the error signal applied to the first input terminal 14. When a timing cycle of the timing circuit means 16 has been completed, a signal is coupled from the output terminal 22 thereof to the gating means 12 disabling same to cause de-activation of the pressure adjusting means 18.

To assure fail-safe operation, a safety checking means 23 is provided for scheduling a preselected pressure level for the fluid system if the actual pressure thereof is not brought within certain limits of that desired within a predetermined time. Thus, for example, when the fluid system is an air brake system for vehicles, safety checking means 23 schedules full vehicle braking effort whenever the actual braking effort is less than that desired by a certain amount and remains that way beyond a predetermined time.

As shown, safety checking means 23 includes a timing circuit means 24, a comparison circuit means 25, an emergency pressure adjusting means 26 and a pressure transducer means 27 which may be similar to timing circuit means 16, comparison circuit means 4, pressure adjusting means 18 and pressure transducer means 8 respectively.

For example, in an air brake system safety checking means 23 may be arranged to provide for an error signal from comparison circuit means 25 whenever the actual braking effort is less than that desired. That is, pressure transducer 27 and comparison circuit means 25 sense when the system is operating in a non-fail-safe manner. This error signal is coupled to the input of timing circuit means 24. Operation of timing circuit means 24 is initiated whenever the error signal applied thereto exceeds a certain magnitude. If the error signal persists above that certain magnitude for a time exceeding that of the time cycle of timing circuit means 24 then the emergency pressure adjusting means 26 is operated to apply full braking effort to the vehicle.

The dash-lines of FIG. 1 symbolically illustrate interconnections between the components 8, 18, 26 and 27 with the fluid system of the air brake system. These interconnections are more clearly illustrated in FIG. 2.

During the operation of the control system, shown in simplified block diagram form in FIGURE 1, electrical signals are coupled from the pneumatic-electric transducer 8 and means 2 to comparison circuit means 4 where they are compared to provide error signals as a function of the difference between them. The error signals are coupled from the output of the comparison circuit means 4 to the gating means 12 and also to the first input terminal 14 of the timing circuit means 16. The gating means 12 is enabled when the error signal applied thereto exceeds a preselected magnitude to cause the pressure adjusting means 18 to be operated to either vent air from the system or apply air to it in accordance with the error signal coupled from the comparison circuit means 4, as explained above.

While the gating means 12 initiates the operation of the pressure adjusting means 18, it does not in and of itself terminate its operation. For example, upon receiving an error signal, as described, a signal from gating means 12 is coupled to the input terminal 20 of timing circuit means 16 to initiate the timing cycle thereof. The duration of the timing cycle varies as a function of the magnitude of the error signal coupled to the input terminal 14. At the termination of the timing cycle an output signal is coupled from the timing circuit means 16 to the gating means 12 to cause the pressure adjusting means 18 to be de-activated.

The comparison circuit means 25 in safety checking means 23 compares the braking effort signal from signal source 2 with signals from the pneumatic electric transducer 27 and provides an error signal. The signal comparison circuit means 25 is arranged to provide an error signal as long as the brake effort signal from source 2 is greater than the signal from the pressure transducer 27. Operation of timing circuit 24 is activated when the magnitude of this error signal exceeds a certain level and remains activated as long as this signal persists above that level. If timing circuit means 24 remains activated for more than a predetermined length of time, this indicates that the air brake system has been applying a braking effort lower than that called for during this time interval and that a malfunction has probably occurred. The timing circuit 24 then activates the emergency pressure adjusting means 26 changing the pressure to apply maximum braking effort to the vehicle.

Figure 2:
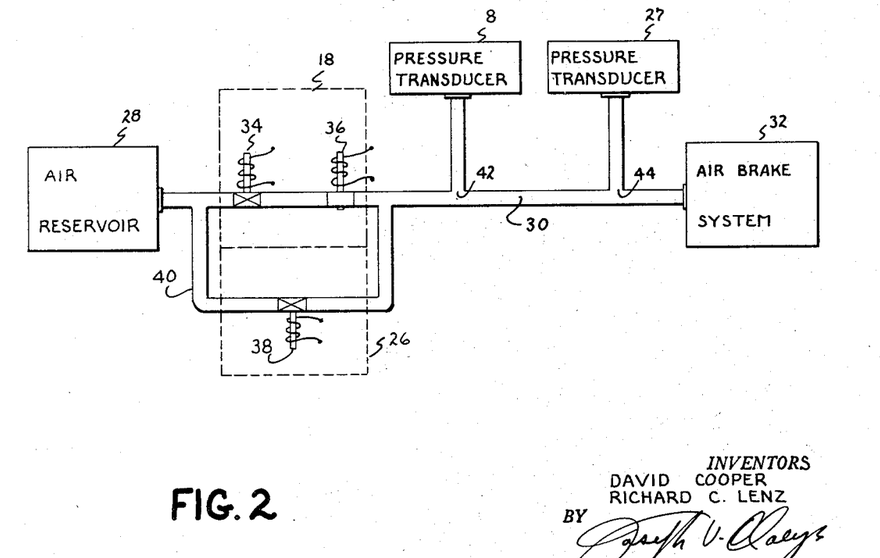
FIG. 2 is a schematic diagram depicting an air brake system which is to be controlled by the fluid pressure control system shown in FIG. 1.

Reference may be had to FIGURE 2 for a general description of an air brake system in accordance with one aspect of this invention; corresponding components in FIGS. 1 and 2 being marked with the same numerals.

The air brake system includes an air reservoir 28 which is maintained at a predetermined pressure by appropriate means such as an air compressor. Air is conducted from the reservoir 28 and through an air conduit 30 to air brakes 32.

The pressure adjusting means 18 and the emergency pressure adjusting means 26 include air valves in the air brake system. The pressure adjusting means 18 comprises an application valve 34 and a release valve 36. To provide fail-safe operation of the air brake system in the arrangement illustrated, the application valve, which normally blocks the flow of air from the reservoir 28 to the air brakes 32, is normally energized. That is, assuming that the valve is an electromagnetic type valve, the solenoid is energized to cause the valve to block the flow of air through the conduit 30 and is de-energized to permit air to flow. Thus, should the energizing circuit for the solenoid of the valve 34 fail, air is coupled from the reservoir 28 to the air brakes 32 to stop the vehicle. On the other hand, the release valve 36, which vents air to the atmosphere when the pressure on the air brakes is too high, has its solenoid normally de-energized. When the solenoid is energized, air is vented from the conduit 30. Should the energization circuit for the solenoid fail, air is not being vented to the atmosphere.

The emergency pressure adjusting means 26 also includes an application type valve 38 which can apply air pressure from the air reservoir and through an emergency conduit 40 to the air brake side of the valves 34 and 36 in the conduit 30.

The pneumatic-electrical transducers 8 and 27 monitor the pressure in the conduit 30 at test points 42 and 44, respectively.

Figure 3:
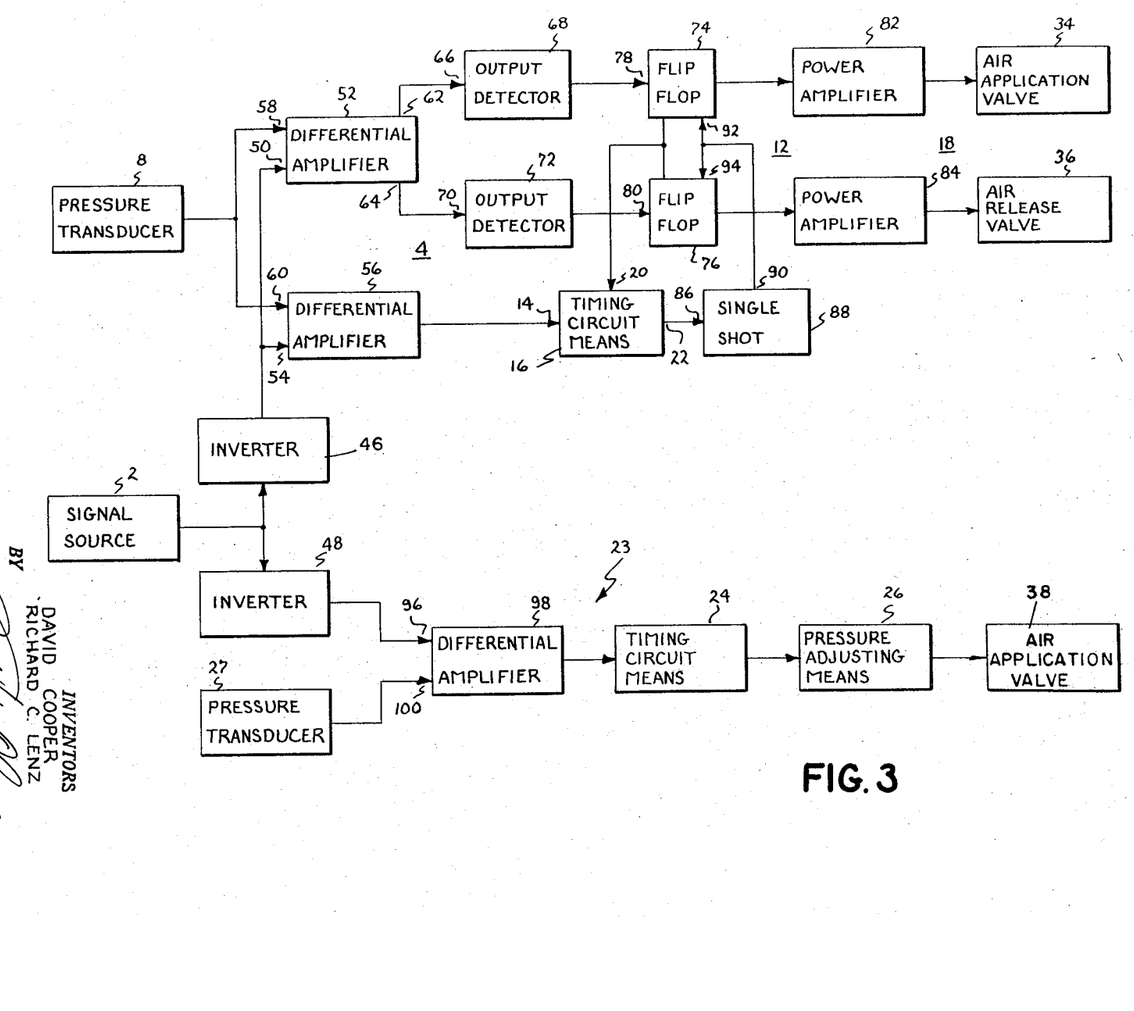
FIG. 3 is a schematic diagram of one embodiment of this invention which is adapted to provide continuous air brake control for a rapid transit or other railway system.

FIG. 3 shows an air brake control system specifically designed in accordance with the principles of this invention for use with rapid transit and other railway vehicles. The braking effort control signals are coupled from source 2 into each of a pair of inverters 46 and 48. The inverters 46 and 48 are used to change the polarity of a braking effort signal, which is negative with respect to the computer ground potential established in the signal source 2 itself, as more fully explained in the above referenced patent application, before the signal is coupled to the signal comparison means 4 and 25.

Signals are coupled from the inverter 46 to an input terminal 50 of a differential amplifier 52 and to an input terminal 54 of a differential amplifier 56 in the comparison circuit means 4. Output signals from the pneumatic-electric transducer 8 are coupled to an input terminal 58 of the differential amplifier 52 and to an input terminal 60 of the differential amplifier 56.

Figure 4:
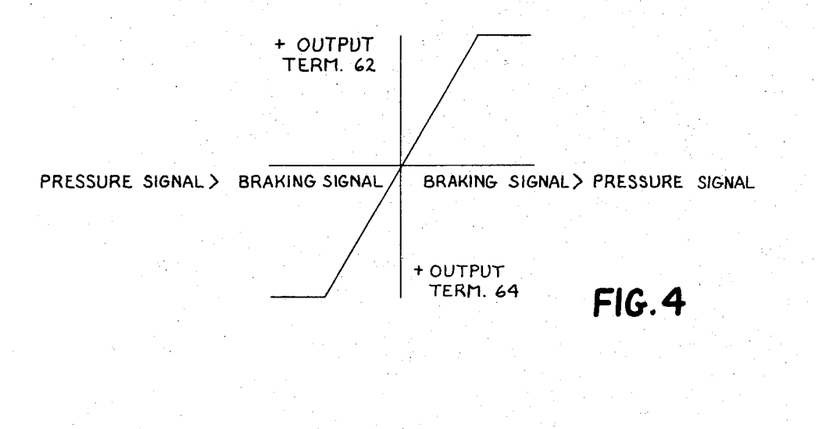
FIG. 4 is a graph of the transfer characteristics of a differential amplifier which may be utilized in this invention.

The differential amplifier 52 has a pair of output terminals 62 and 64. The terminal 62 couples error signals to the input terminal 66 of an output detector 68, while the terminal 64 couples error signals to an input terminal 70 of an output detector 72. The characteristics of the differential amplifier 52 may be seen by referring to FIG. 4. The relative size of the signals at the input terminals 58 and 50 determines whether an error signal is coupled from either the output terminal 62 or the output terminal 64. Where a pressure signal from the pressure transducer 8 is greater than the braking effort signal from the inverter 46, indicating that more braking force is being applied than is called for by the signal from source 2, an error signal is produced at the output terminal 64. When the braking effort signal from the inverter 46 is greater than the pressure signal from the transducer 8, indicating that a greater braking effort is being called for than is being applied, an error signal is provided at the output terminal 62. The differential amplifiers 52 and 56 must perform the following three functions:

(1) compare the actual braking effort signal and the desired braking effort signal at the input terminals, such as 58 and 50 of differential amplifier 52;
(2) amplify the difference between these two signals; and
(3) reject the common mode of the two input signals.

The comparison and amplification functions are readily performed by many differential amplifiers. However, some additional care must be taken to obtain a high degree of common mode rejection.

With a common mode rejection feature, a differential amplifier, such as 52, has an output dependent on the difference between the input signal levels. For example, if the electrical signal applied to input terminal 58 has a magnitude of 5.0 volts and the desired braking effort signal applied at the input terminal 50 has a magnitude of 5.1 volts, a particular error signal is generated at the terminal 62. The same error signal is generated at terminal 62 when the electrical signal at the input terminal 58 is 1.0 volt and the braking effort signal at the input terminal 50 is 1.1 volts.

The output detectors 68 and 72 are designed to respond only to error signals having a magnitude greater than a predetermined threshold level. These detectors provide stability for the air brake control system by preventing it from responding to small error signals.

The gating means 12 includes a pair of bi-stable multivibrators 74 and 76 which are responsive to correctable error signals from the output detectors 68 and 72. The correctable error signal from the output detector 68 is coupled to an input terminal 78 of bi-stable multivibrator 74, while the correctable error signal from the output detector 72 is fed to an input terminal 80 of bi-stable multivibrator 76. When multivibrator 74 is triggered by the correctable error signal it energizes a power amplifier 82 which activates an air pressure activation valve such as the valve 34 in FIG. 2. When multivibrator 76 is triggered by a correctable error signal from the output detector 72 it energizes a power amplifier 84 which activates an air release valve such as the valve 36 shown in FIG. 2. A suitable power amplifier circuit must provide around five amperes of current, withstand an approximately 500 volt "kick," and react quickly to input pulses. When either of the bi-stable multivibrators 74 and 76 is triggered, a signal is coupled therefrom to the second input terminal 20 of the timing circuit means 16.

Figure 5:
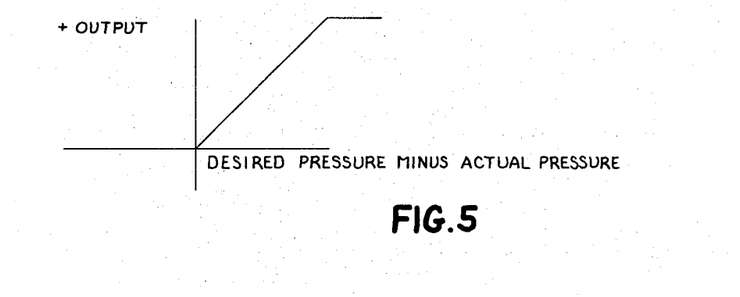
FIG. 5 is a graph showing the transfer characteristics of another differential amplifier which may be used in this invention.

As described above with respect to FIG. 1, the timing circuit means 16 must be such that the duration of its timing cycle varies with the voltage level at its first input terminal 14. For this reason the differential amplifier 56 has a characteristic such as that shown in FIG. 5. This differential amplifier compares the input signals at the terminals 54 and 60, rejects the common mode of these two signals, and amplifies the difference between these two signals. The output signal comprises the absolute value of the difference between these signals.

While the timing circuit means 16 may comprise any such circuit which is triggered by a signal at one input terminal to produce a timing cycle proportional to the voltage level of a signal at another input terminal, one suitable circuit for this purpose is discussed below with reference to FIG. 7.

The output terminal 22 of the timing circuit means 16 is coupled to an input terminal 86 of a monostable multivibrator 88. An output terminal 90 of monostable multivibrator 88 is coupled to reset terminals 92 and 94 of the bi-stable multivibrators 74 and 76, respectively.

Figure 6:
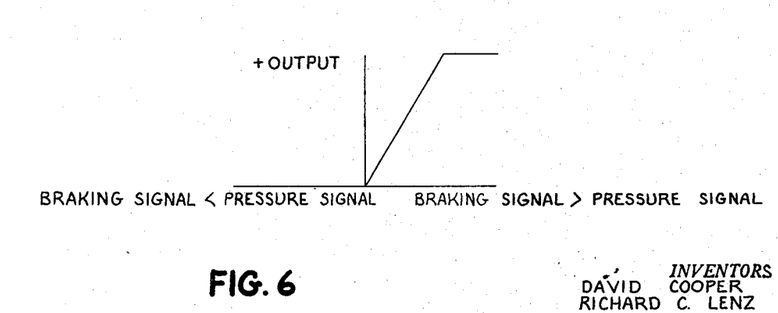
FIG. 6 is a graph showing the transfer characteristics of still another differential amplifier which may be used in accordance with this invention.

In a failure sensing portion of the circuit, the braking effort command signal from source 22 is coupled through the inverter 48 to an input terminal 96 of the comparison means, shown as differential amplifier 98. The electrical signal from pressure transducer means 27 is applied to the input terminal 100 of differential amplifier 98 which has the operating characteristic shown in FIG. 6. When the magnitude of the braking signal coupled through the inverter 48 is less than the magnitude of the electrical signal from transducer means 27, there is no output voltage from the differential amplifier 98. With the vehicle operating in this condition the control system is functioning in a safe manner. That is, the vehicle is being braked to a greater extent than is necessary, thereby causing the vehicle to travel at a slower speed than is necessary. However, if the magnitude of the braking signal from the inverter 48 is greater than the magnitude of the electrical signal from transducer 27, an output voltage is coupled from the differential amplifier to the timing circuit means 24. This condition signifies that there is less braking effort than is required, and thus the vehicle is traveling at a greater rate of speed than is indicated by the signal from source 2. If this condition persists for longer than the predetermined timing cycle of the timing circuit 24, an emergency valve 38 in the emergency pressure adjusting means 26 is activated.

During the normal operation of the air brake control system shown in FIG. 3, a braking effort control signal is coupled through the inverter 46 to the differential amplifiers 52 and 56. Signals indicative of the actual air brake pressure are also coupled to these differential amplifiers. When the braking effort signal at the input terminal 50 is greater than the pressure signal at the input terminal 58, the differential amplifier 52 generates an error signal at the terminal 62. If the error signal is greater than the threshold level of the output detector 68, this detector triggers bi-stable multivibrator 74, changing its conduction state and energizing the power amplifier 82 which controls the operation of the air application valve 34 to increase the pressure in the system.

Bi-stable multivibrator 74 also starts the timing cycle of the timing circuit means 16. As multivibrator 74 changes its state of conduction, the signal coupled therefrom to the second input terminal 20 starts the cycle of timing circuit means 16. The differential amplifier 56 also generates an error signal as a function of the difference between the braking effort signal from source 2 and the electrical signal from pressure transducer 8. This error signal is coupled to the input terminal 14 where it controls the duration of the timing cycle of the timing circuit means 16. At the end of a timing cycle an output signal from the terminal 22 triggers the monostable multivibrator 88, causing ti to generate a reset signal at the reset terminal 92 of bi-stable multivibrator 74. The signal at the terminal 92 drives bi-stable multivibrator 74 back to its original conduction state. The power amplifier 82 is now de-energized and the air application valve 34 returns to its unoperated condition. Thus, the air application valve 34 is operated for a time which varies as a function of the error signal, once the error signal becomes greater than the threshold level of the output detector 68.

When the signal from pressure transducer 8 is greater than the braking effort signal from source 2, the operation of the circuit is similar to that described above, except that the output signal from the differential amplifier 52 is coupled from the output terminal 64. If the signal is greater than the threshold level of the output detector 72, a signal is coupled through bi-stable multivibrator 76 to energize the power amplifier 84 and cause operation of the air release valve 36. The differential amplifier 56, the timing circuit 16, and monostable multivibrator 88 control the time during which air is released from the system.

Figure 7:
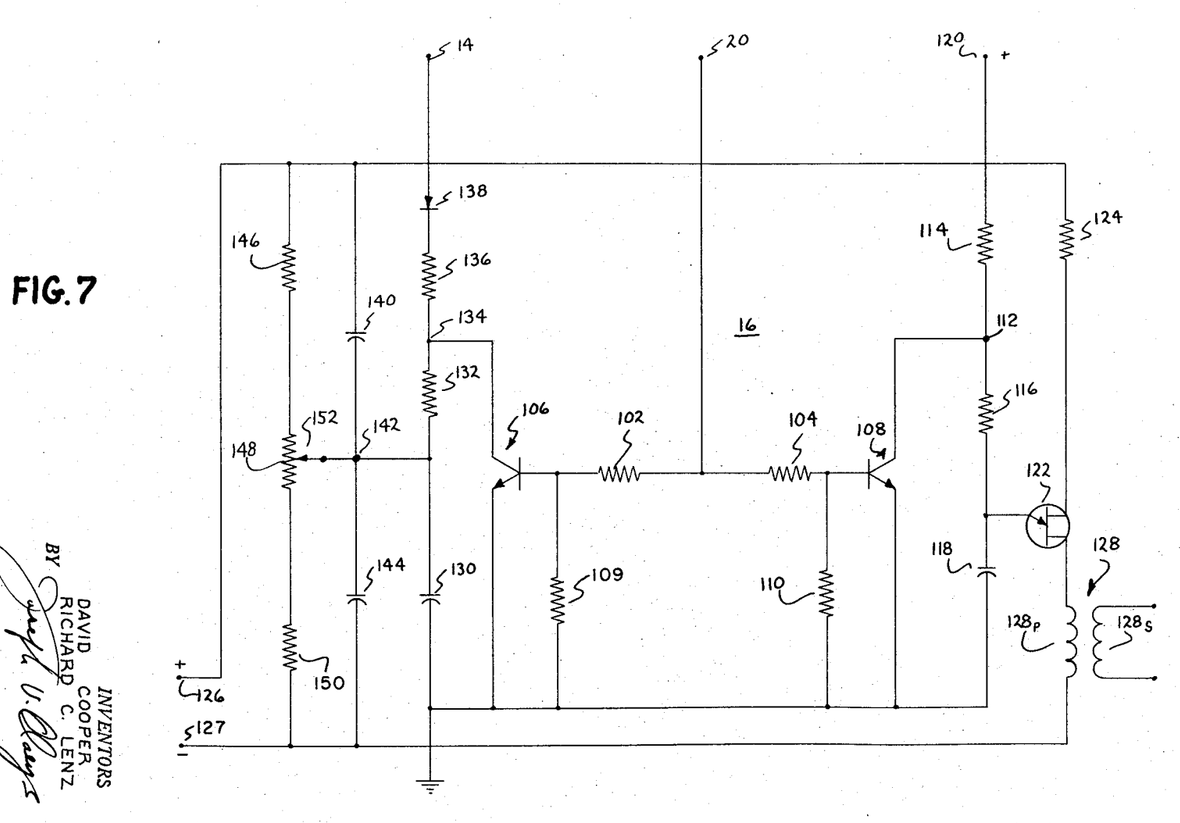
FIG. 7 is a schematic diagram of a timing circuit which provides an error signal-responsive timing cycle for this invention.

FIG. 7 is a schematic diagram of a timing circuit, such as the timing circuit means 16 described above. The timing circuit can be triggered by a signal at one input terminal to provide a timing cycle having a duration which is a function of the signal level at another input terminal. The input terminal 20 is coupled through resistors 102 and 104 to the base electrodes of transistors 106 and 108, respectively. The base electrode of the transistor 108 is coupled to ground through a resistor 110.

The timing cycle is generated by a relaxation oscillator circuit. The collector electrode of the transistor 108 is coupled to a junction 112 between a pair of resistors 114 and 116 in the charging circuit of a capacitor 118. The positive terminal of a grounded power supply is connected to a terminal 120 to charge a capacitor 118. The base two electrode of a unijunction transistor 122 is coupled through a resistor 124 to a terminal 126 of an isolated power supply. The base one electrode is coupled through the primary winding 128P of a pulse transformer 128 to a negative terminal 130 of the isolated power supply. The secondary winding 128S of the pulse transformer is coupled to the output terminals 122 of the timing circuit 16.

A second timing circuit comprises a timing capacitor 130 which is coupled through a resistor 132, a junction 134, a resistor 136, and from cathode to anode of the diode 138 to the input terminal 14. The combined impedance of the resistors 132 and 136 is substantially less than the impedance of the resistors 114 and 116 so that the capacitor 130 charges more quickly than does the capacitor 118. A filter capacitor 140 is connected from the terminal 126 to the junction 142, and a filter capacitor 144 is coupled from the junction 142 to the terminal 127. A resistive voltage divider comprising a resistor 146, a potentiometer 148, and a resistor 150 is coupled across the terminals 126 and 127. The slide wire 152 of the potentiometer 148 is connected to the junction 142 to adjust the bias coupled from the capacitor 130 to the unijunction transistor 122.

While the timing circuit is in its quiescent state, the transistors 106 and 108 are biased in a normally conducting state to shunt current away from the capacitors 118 and 130. The capacitors 118 and 130 are not charged and the emitter-base one voltage at the unijunction transistor 122 is below the standoff voltage level of this transistor. When the charging cycle is initiated, as by a signal from either of the bi-stable multivibrators 74 or 76 in FIG. 3, the terminal 20 is grounded. This turns off the transistors 106 and 108 and allows the capacitor 118 to begin charging through the resistors 112 and 116 and allows the capacitor 130 to begin charging through the resistors 132 and 136. Due to the low impedance of the resistors 132 and 136, the capacitor 130 quickly charges to the voltage level at the terminal 14, that of the error signal at the differential amplifier 56. The voltage across the capacitor 130 is coupled through the slide wire 152, a portion of the potentiometer 148, the resistor 150, and the primary winding 128P to reverse bias the emitter-base one region of the unijunction transistor 122. The bias level may be changed by adjusting the slide wire 152.

The slide wire 152 is adjusted to fire the unijunction transistor 122 when the capacitor 118 charges to a voltage level greater than that on the capacitor 130. This terminates the timing cycle of the timing circuit by discharging the capacitor 118 through the pulse transformer 128. The output pulse is coupled from the secondary winding 128S and through the terminals 22.

In the embodiment of the timing circuit just described the duration of the timing cycle varies exponentially with the error signal at the input terminal 14. This is due to the fact that the potential at the terminal 120 charges the capacitor 118 at the RC time constant of the resistors 114 and 116 and the capacitor 118. An exponentially varying time constant may be desirable in some systems because of the dynamics of the pipes in the air brake system. However, the rate of charge of the capacitor 118 may be varied without deviating from the scope of this invention. For example, a constant current source may be coupled between the terminal 120 and the junction 112 to provide a time delay which varies directly with a change in the error signal at the terminal 14.

Figure 8:
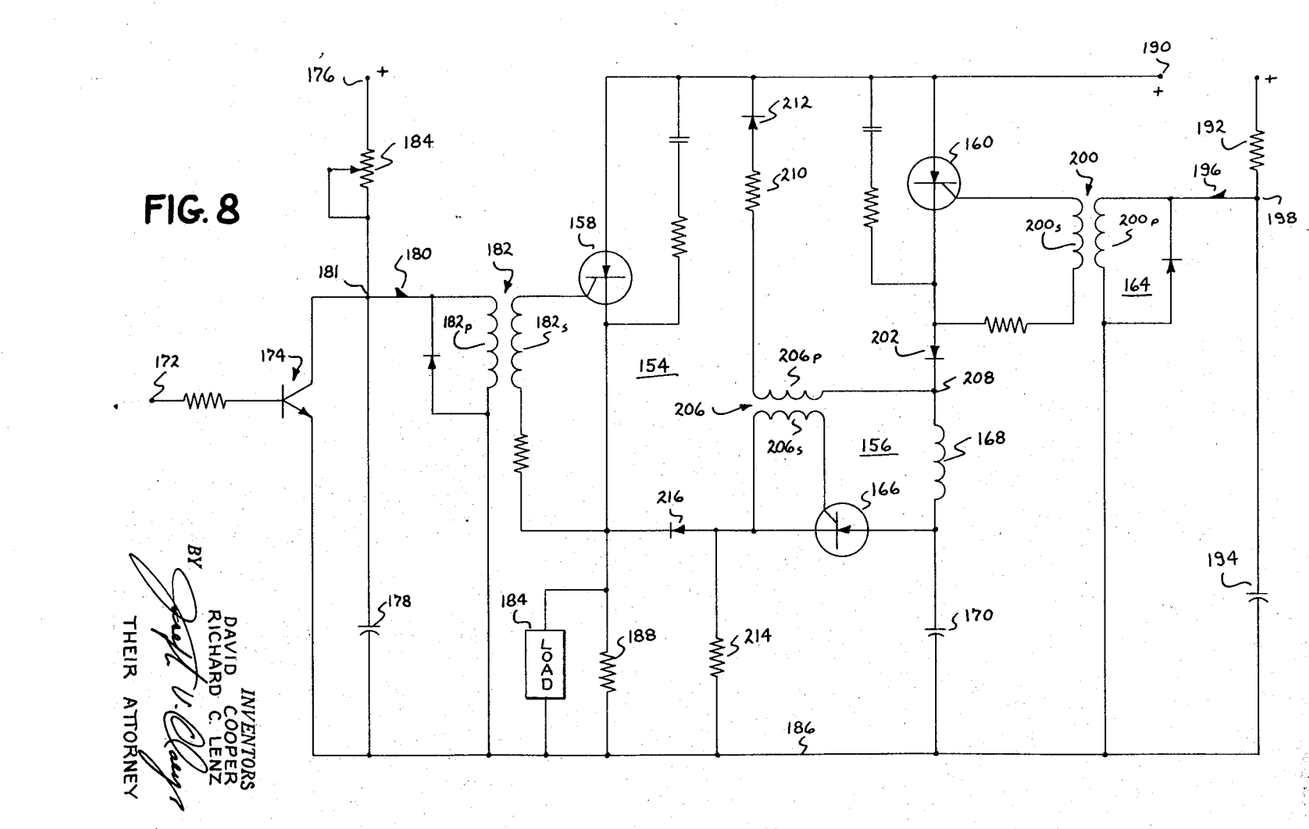
FIG. 8 is a schematic diagram of a power amplifier which may be used in the embodiment of this invention shown in FIG. 3.

FIG. 8 shows one embodiment of the power amplifiers 82 and 84 which operates satisfactorily in the subject brake control system. The power amplifier must supply a five ampere output current, withstand 500 volt inductive "kicks" due to the valve solenoid, and operate with a minimum time delay. Due to the high voltage requirement a silicon controlled rectifier power supply was selected instead of one utilizing transistors.

This power amplifier circuit comprises a pair of controlled rectifier circuits 154 and 156, including the silicon controlled rectifiers 158 and 160, fired by "four-layer diode" or "Shockley diode" relaxation oscillator circuits 162 and 164, respectively. The commutation of the SCR's 158 and 160 is controlled by an SCR 166 and a series resonant circuit comprising an inductor 168 and a capacitor 170. A circuit using similar principles is disclosed in U.S. Patent 3,192,468—Buchanan et al., assigned to the assignee of the present invention. The relaxation oscillator 162 controls the firing of the SCR 158 in response to the signals from bi-stable multivibrators, as shown in FIG. 3. An input signal from a bi-stable multivibrator is coupled through an input terminal 172 in the base circuit of a transistor 174 of the relaxation oscillator circuit 162. The transistor 174 is normally conducting, shunting current supplied by a power supply at a terminal 176 from a timing capacitor 178. The anode of a Shockley diode 180 is connected to a junction 181 of the capacitor 178 and a rheostat 184. The cathode of the Shockley diode 180 is coupled to the primary winding 182P of a pulse transformer 182. The secondary winding 182S of this pulse transformer is coupled to the gate electrode of the SCR 158. A load 184, comprising the solenoid of either the air application valve 34 or the air release valve 36, shunts a resistor 188 between the cathode of the SCR 158 and a common bus 186. The resistor 188 provides a holding current path for the SCR 158. A source of positive potential at terminal 190 energizes the load 184.

The relaxation oscillator firing circuit 164 is similar to the oscillator circuit 162, except that it is a free running circuit having no means for discontinuing its operation. The timing circuit comprises a resistor 192 and a timing capacitor 194. A Shockley diode 196 is coupled from anode to cathode between a junction 198 and a primary winding 200P of a pulse transformer 200. The secondary winding 200S of the pulse transformer is in the gate circuit of the SCR 160 as a source of firing pulses for this SCR. A diode 202 is coupled from anode to cathode between the SCR 160 and the inductor 168. Firing pulses are fed to the SCR 166 from the series resonant circuit through a pulse transformer 206. A primary winding 206P is connected from a junction 208 and through a resistor 210 and a diode 212 to the terminal 190.

Energy from the controlled rectifier circuit 156 is coupled through the SCR 166, across a resistor 214 and through a diode 216 to commutate the SCR 158.

If the load 184 of the power amplifier shown in FIG. 8 is to be in a de-energized state, the transistor 174 is biased normally on. This transistor shunts charging current from the capacitor 178 and the SCR 158 is not fired.

When the load 184 is to be energized, the SCR 158 must be turned on. At this time, the terminal 172 is grounded to turn off the transistor 174. The capacitor 178 is charged to the breakdown level of the Shockley diode 180. As the impedance level of the Shockley diode decreases substantially, the capacitor 178 is discharged through the primary winding 182P. The secondary winding 182 couples a pulse to the gate circuit of the SCR 158 to fire it. Current is now applied to the load 184 from the terminal 190.

The SCR circuit 156 generates a voltage which periodically commutates the SCR 158. The relaxation oscillator 164 operates in a manner similar to that of the oscillator 162, thereby coupling firing pulses through the transformer 200 to the gate circuit of the SCR 160. When the SCR 160 is fired, energy from the terminal 190 charges the capacitor 170 in the series resonant circuit. After the voltage level at the capacitor 170 reaches the voltage level at the anode of the diode 202, this diode is reverse biased and turns off. A voltage pulse is coupled from the series resonant circuit and through the pulse transformer 206 to the gate circuit of the SCR 166. At the same time the charge on the capacitor 170 increases until its voltage level is approximately twice the voltage level of the power supply at the terminal 190, due to the resonant nature of the series charging circuit. The SCR 166 and the diode 216 are forward biased by this voltage, the SCR 166 being turned on by the pulse in its gate circuit. This resonantly-generated voltage then reverse biases the SCR 158 to turn it off.

The frequency of the oscillator 162 is substantially higher than the frequency of the oscillator 164. Thus once the SCR 158 is turned off it may be quickly fired again if the input terminal 172 is still grounded.

This invention is not limited to the particular details of the preferred embodiments illustrated, and it is contemplated that various modifications and applications within the scope of this invention will occur to those skilled in the art. It is therefore intended that the appended claims cover such modifications which do not depart from the direct spirit and scope of this invention.

What we claim as new and desire to secure by Letters Patent of the United States is:

1. A control system for regulating the pressure in a fluid system comprising:
  (a) pressure adjusting means associated with said fluid system and effective when operated to alter the pressure in said fluid system;
  (b) comparison circuit means for deriving an error signal from a first electrical signal representative of the actual pressure at a given location of the fluid system and a second electrical signal representative of a desired pressure at that location;
  (c) gate means operative to produce an output signal when said error signal exceeds a preselected magnitude; and
  (d) power amplifier means responsive to the output signal from said gate means for controlling the operation of said pressure adjusting means, said power amplifier means having a speed of response at least two orders of magnitude faster than the speed of response of said fluid system.

2. A control system for regulating the pressure in a fluid system comprising:
  (a) pressure adjusting means associated with the fluid system and effective when operated to alter the pressure in said fluid system;
  (b) comparison circuit means for deriving an error signal from a first electrical signal representative of the actual pressure at a given location of the fluid system and a second electrical signal representative of a desired pressure at that location;
  (c) gate means having said error signal applied thereto and being enabled when the error signal exceeds a preselected magnitude to provide an output signal for controlling the operation of said pressure adjusting means;

(d) timing circuit means having said error signal and a signal from said gate means applied thereto, said timing circuit means being initiated into operation by the signal from said gate means and having a time cycle determined by the magnitude of said error signal; and (e) means coupling a signal from said timing circuit means to said gate means operative to disable said gate means at the end of the time cycle so that operation of said pressure adjusting means is terminated.

3. In a control system for regulating the pressure in a fluid system in accordance with electrical signals representative of a desired pressure comprising:

(a) pressure sensing means for producing an electrical signal representative of the actual pressure of the fluid system;

(b) signal comparison circuit means;

(c) means coupling said electrical signals representing the desired pressure and the electrical signals from said pressure sensing means to said signal comparison circuit means to provide an error signal whose magnitude varies as a function of the difference between the two electrical signals;

(d) pressure adjusting means operative when actuated to alter the pressure in said fluid system;

(e) gating means operative to provide an output signal when said error signal exceeds a preselected magnitude;

(f) means coupling the output signal of said gating means to said pressure adjusting means to cause said pressure adjusting means to be actuated in response to such output signal;

(g) timing circuit means responsive to an applied error signal and a signal from said gating means to provide an output signal at a time after application of the signal from said gating means which is determined by the magnitude of said applied error signal; and (h) means coupling the output of said timing circuit means to said gating means operative to disable said gating means so that operation of said pressure adjusting means is terminated.

4. A control system for regulating fluid pressure in a fluid system comprising in combination:

(a) means for adjusting the pressure level in the fluid system;

(b) transducer means for sensing the pressure in the fluid system and providing an electrical signal representative of such pressure;

(c) a source of electrical signals representing a desired fluid pressure;

(d) signal comparison circuit means having first and second input terminals, said comparison circuit means providing error signals which vary as a function of the difference between signals at said input terminals, means for coupling the electrical signals from said transducer means to said first input terminal, and means for coupling the electrical signals from said signal source to said second input terminal;

(e) gating circuit means coupled to said comparison circuit means and to the pressure adjusting means to initiate operation of said pressure adjusting means to change the pressure level in the fluid system in response to said error signals;

(f) timing circuit means having first and second input terminals and an output terminal, said timing circuit means having a timing cycle which is initiated by a signal at said first input terminal and varies as a function of the signal level at said second input terminal; means for coupling error signals from said comparison circuit means to said second input terminal and means for coupling a signal from said gating circuit means to said first input terminal; and (g) means for connecting the output of said timing circuit means to said gating circuit means to terminate the operation of said pressure adjusting means at the end of the timing cycle.

5. A control system according to claim 4 further comprising:

(a) a second transducer means for sensing pressure in the fluid system and providing a second electrical signal representative of such pressure;

(b) second signal comparison circuit means having first and second input terminals, said second comparison circuit generating a second error signal which varies as a function of the difference between electrical signals at its input terminals, means for coupling electrical signals from said second transducer means to said first input terminal and means for coupling electrical signals from said signal source to said second input terminal; and (c) a second pressure adjusting means for changing the fluid pressure level in response to a predetermined duration of the second error signal.

6. A control system according to claim 4 wherein said timing circuit means comprises:

(a) a relaxation oscillator including first and second timing capacitors, means for connecting said first timing capacitor to the first input terminal thereof; and (b) means for normally shunting charging current from said timing capacitors, the last-mentioned means being controllable to stop shunting said capacitors, and means for connecting said last-mentioned means to the second input terminal of said timing circuit means.

7. A control system according to claim 4 wherein said signal comparison circuit means comprises a differential amplifier having a high degree of common mode rejection and output detector means connected between said differential amplifier and said gating circuit means to establish an error signal threshold level.

8. A control system according to claim 7 wherein:

(a) said differential amplifier provides output signals at a first output terminal when the signal level at said first input terminal is greater than the signal level at said second input terminal and provides output signals at a second output terminal when the signal level at said first input terminal is less than the signal level at said second input terminal;

(b) said gating circuit means comprises a first bi-stable multivibrator coupled through said output detector means to a first output terminal and a second bi-stable multivibrator coupled through said output detector means to a second output terminal.

9. A control system according to claim 8 wherein:

(a) said signal comparison circuit means comprises a second differential amplifier coupled to the first input terminal of said timing circuit means; and (b) monostable multivibrator means responsive to said timing circuit means and being arranged in circuit between said timing circuit output terminal and said first and second bi-stable multivibrators.

10. A continuous air brake pressure control system comprising in combination:

(a) transducer means for sensing the fluid pressure in the system and providing an electrical signal representative of such pressure;

(b) a source of electrical signals representing a desired fluid pressure;

(c) signal comparison circuit means having first and second input terminals, said comparison circuit means providing electrical error signals which vary as a function of the difference between the signal level at said input terminals, means for coupling electrical signals from said transducer means to said first input terminal, and means for connecting the source of electrical signals representing a desired fluid pressure to said second input terminal;

(d) pressure adjusting means for adjusting pressure level in the fluid system;

(e) gating circuit means coupled to said comparison circuit means and to said pressure adjusting means to control the operation of said pressure adjusting means and change the fluid pressure level in response to error signals;

(f) timing circuit means having first and second input terminals and an output terminal, said timing circuit means having a timing cycle which is initiated by a signal at said first input terminal and varies as a function of the signal level at said second input terminal, means for coupling an output from said comparison circuit means to said second input terminal and means for coupling signals from said gating circuit means to said first input terminal; and (g) means for connecting said timing circuit output terminal to said gating circuit means to terminate the operation of said pressure adjusting means at the end of the timing cycle.

11. A control system according to claim 10 wherein said timing circuit means comprises:

(a) a relaxation oscillator including first and second timing capacitors and a unijunction transistor, means for connecting said first timing capacitor to the first input terminal of said timing circuit means;

(b) transistor circuit means for normally shunting charging current from said timing capacitors, said transistor circuit being controllable to stop shunting said capacitors, and means for connecting said transistor means to the second input terminal of said timing circuit means.

12. A control system according to claim 10 further comprising:

(a) a second transducer means for sensing pressure in the fluid system and providing a second electrical signal representative of such pressure;

(b) second signal comparison circuit means having first and second input terminals, said second comparison circuit means generating a second error signal which varies as a function of the difference between signals at its input terminals; means for coupling signals from said second transducer means to said first input terminal and means for coupling signals from said source to said second input terminal; and (c) a second pressure adjusting means for changing the fluid pressure level in response to a predetermined duration of the second error signal.

References Cited

UNITED STATES PATENTS 3,334,224   8/1967   Allen et al. _________ 246—187

MILTON BUCHLER, *Primary Examiner.*

J. J. McLAUGHLIN, *Assistant Examiner.*